Figure 1:
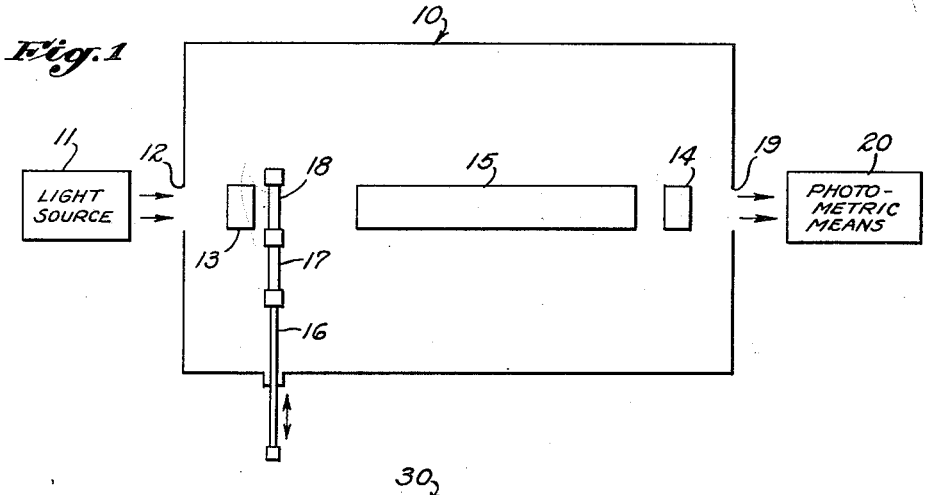

April 8, 1958     A. S. KESTON     2,829,555

POLARIMETRIC METHOD AND APPARATUS

Filed Aug. 6, 1951     2 Sheets-Sheet 1

INVENTOR:
ALBERT S. KESTON
BY HIS ATTORNEYS
HARRIS, KIECH, FOSTER & HARRIS

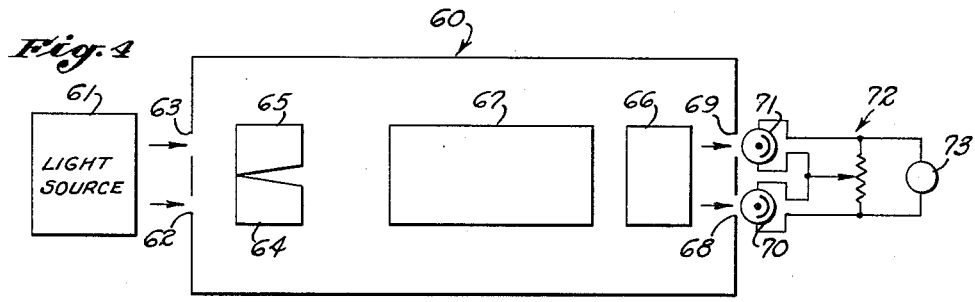
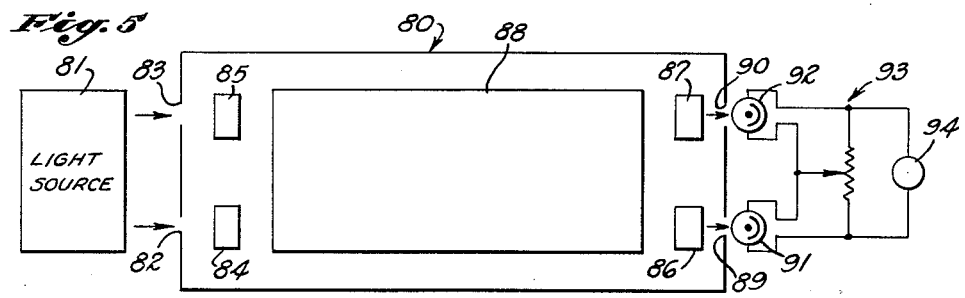
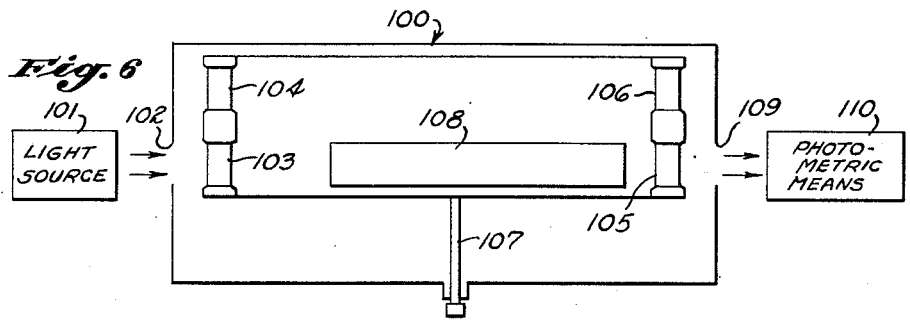
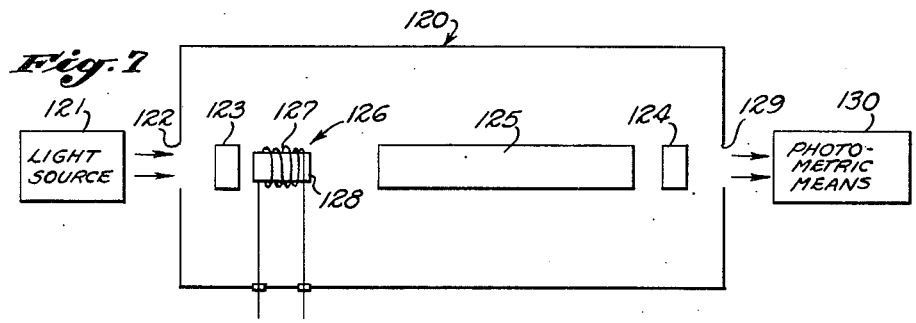

United States Patent Office 2,829,555
Patented Apr. 8, 1958

2,829,555

POLARIMETRIC METHOD AND APPARATUS

Albert S. Keston, New York, N. Y.

Application August 6, 1951, Serial No. 240,598

7 Claims. (Cl. 88—14)

The present invention relates in general to polarimetry and the principal object of the invention is to provide an improved polarimetric method and apparatus.

Conventionally, a polarimeter includes at least two polarizing elements, which may be Nicol prisms, sheet material containing polarizing crystals, and the like. One of the polarizing elements, usually termed the polarizer, may be fixed and the other, usually designated as the analyzer, is rotatable so that the angle between the polarizing axes of the two elements may be varied. When light is directed through the two polarizing elements of such a conventional polarimeter, in a direction from the polarizer to the analyzer, maximum light transmission is attained when the polarizing axes of the polarizer and analyzer are parallel and substantially zero light transmission, or extinction, is attained when the polarizing axes of the polarizer and the analyzer are perpendicular to each other. In other words, if the analyzer is rotated into a position such that its polarizing axis is parallel to the plane of polarization of the beam of plane polarized light passed by the polarizer, maximum light transmission through the analyzer is attained, and, if the analyzer is rotated to a position such that its polarizing axis is perpendicular to the plane of polarization of the plane polarized light transmitted by the polarizer, extinction is attained. The conventional polarimeter includes a divided circle for indicating the angular position of the analyzer to the left or right of extinction.

Polarimeters are widely used in identifying and determining the concentrations of optically active substances, an optically active substance being one which rotates the plane of polarization of plane polarized light passing therethrough. In the conventional polarimeter discussed in the preceding paragraph, if an optically active substance, such as an optically active solution, is placed between the polarizer and the analyzer, the plane of polarization of the plane polarized light transmitted by the polarizer is rotated through an angle which depends on the nature of the substance and its concentration, the direction of rotation of the plane of polarization also depending on the nature of the substance. Consequently, if the analyzer was previously set for extinction, the analyzer no longer produces extinction due to rotation of the plane of the polarized light, produced by the polarizer, by a substance placed in the beam between the polarizer and the analyzer. Consequently, the angle of rotation produced by the substance may be determined by rotating the analyzer to extinction and reading the angle on the divided circle associated with the analyzer. This angle is indicative of the concentration of a solution of a known substance, or is of assistance in identifying unknown substances, both the magnitude and the direction of the angle being characteristic for any optically active substance at any given concentration and temperature. If the substance rotates the plane of polarization to the left, i. e., counterclockwise as viewed against the oncoming beam, the substance is classed as levorotatory, and, if to the right, or clockwise, the substance is dextrorotatory. Thus, the direction of the angle indicated by the divided circle in itself provides an elementary distinction between various substances.

Since it is difficult to determine exactly when extinction occurs in a uniformly illuminated field, even with photoelectric means, a simple polarimeter of the foregoing character is not sufficiently accurate for many applications. To minimize errors in setting the analyzer to extinction, the conventional polarimeter is provided with an element between the analyzer and the polarizer which splits the field, into two (or more) parts, effectively by rotating one or more portions of the beam with respect to the remainder of the beam, so that the two or three sections of the field are not extinguished at the same angular position of the analyzer. However, the angular position at which the two halves of the field match (or two equal outer segments match a third, central section) can be more sensitively determined than can the extinction angle in the previously described simple polarimeter. Rotation produced by a sample is then measured as the difference angle in analyzer position when fields are matched, first with an optically inactive sample, then the optically active sample. While conventional polarimeters employing field matching are more accurate than the simple conventional polarimeters discussed previously, residual, irreducible errors inherent in the limitations of eye sensitivity, in divided circle calibration, and in the reading operation itself, still are present. These are too large for work of the highest accuracy, particularly when very small angles of rotation must be measured, even when photoelectric means are employed in matching the sections of the split field.

A primary object of the present invention is to provide a polarimetric method and apparatus which attain greater accuracy and sensitivity than heretofore attainable by eliminating the divided circle.

More particularly, a primary object of the invention is to provide a method and apparatus wherein two beams of plane polarized light are employed, simultaneously or successively, with their respective planes of polarization angularly offset to the left and to the right of extinction, preferably by small angles. In other words, the primary object of the invention is to provide two beams of plane polarized light whose planes of polarization are angularly displaced to the left and the right, respectively, of an analysis or extinction plane normal to the polarizing axis of a stationary analyzer.

When, in accordance with the present invention, two such beams of plane polarized light offset to opposite sides of extinction are employed, an optically active substance in the beams rotates one of the beams away from extinction to increase the intensity of the light transmitted by the analyzer and rotates the other toward extinction to decrease the light transmitted. Under these conditions even small angles of rotation produced by substances being examined can be made to result in large changes in the relative intensities of the transmitted portions of the two beams, which is an extremely important feature of the invention.

Another object of the invention is to employ readily available photometric means, such as a photoelectric cell and measuring circuit, for measuring the intensities of the two beams transmitted by the analyzer. Such available photometric means have already been developed to a high degree of convenience and accuracy for use in spectrophotometers and the like.

While the present invention is applicable to measuring large angles of rotation produced by substances being examined, it is particularly applicable to measuring small angles of rotation since, when small angles of rotation are being measured, small offset angles from extinction may be employed to secure large intensity changes, which is an important feature.

Considering the theory of the present invention, the intensity, I, of the light transmitted by an analyzer may be related to the intensity, $I_0$, of the light incident on the analyzer and the angle, $\theta$, from extinction, i. e., the angle between the plane of polarization of the incident light and the polarizing axis of the analyzer, substantially by the equation $$I = I_0 \sin^2 \theta \quad (1)$$

neglecting small losses due to reflections and absorption. Employing subscripts L and R to identify the polarized beams offset to the left and right, respectively, of extinction, and the symbol $\phi$ for the angle of rotation of either plane of polarization by the optically active substance being examined ($\phi$ being regarded as positive if the substance is dextrorotatory and negative if the substance is levorotatory) we observe:

$$I_L = I_0 \sin^2 (\theta_L - \phi) \quad (2)$$

and $$I_R = I_0 \sin^2 (\theta_R + \phi) \quad (3)$$

When $\theta_L$, $\theta_R$ and $\phi$ are small, the sine of each of these angles may, to an adequate approximation, be taken as equal to the angle itself. Consequently, for such small angles, $$I_L = I_0 (\theta_L - \phi)^2 \quad (4)$$

and $$I_R = I_0 (\theta_R + \phi)^2 \quad (5)$$

In accordance with the present invention, either the difference between $I_L$ and $I_R$ may be measured, or the ratio thereof may be measured. The ratio, Z, of $I_R$ to $I_L$ is, of course, $$(\theta_R + \phi)^2 / (\theta_L - \phi)^2 \quad (6)$$

and may be easily measured with great accuracy by means of conventional photometric apparatus of a form commonly employed in spectrophotometers. If the offset angles $\theta_R$ and $\theta_L$ are exactly known, then the angle of rotation $\phi$ of the optically active substance may be calculated, for example from Equation 6. If $\theta_R$ and $\theta_L$ are not exactly known, however, the instrument may be calibrated with known rotators. i. e., with a series of solutions of known rotation at a given wavelength and temperature, and a calibration chart then plotted of rotation angle $\phi$ as a function of intensity ratio Z. Similarly a chart may be plotted of rotation angle $\phi$ as a function of the difference of the respective intensities expressed by Equations 4 and 5.

A particular advantage in measuring intensity ratio Z, rather than intensity difference, is that even large changes in intensity of the light source or in photometer sensitivity between successive pairs of measurements have no effect on accuracy, since $I_L$ and $I_R$ are affected in equal proportion. Likewise the effect of large absorption differences in successive samples is eliminated. When intensity differences are measured, the sensitivity of the photometer response must be preadjusted to a constant reference level ($I_0$) to compensate for the effect of these factors.

It is important to observe that Equations 4, 5 and 6 are valid regardless of wavelength. Thus a calibration curve constructed as described above is accurate at any wavelength, even if calibrated at a single wavelength only.

Considering now the sensitivity of the method, we observe the following: If the difference between $I_R$ and $I_L$ is small compared to either of these quantities, then the "fractional intensity change," i. e., the difference between $I_R$ and $I_L$ divided by either one, is $$1 - Z \quad (7)$$

Or $$1 - Z = 1 - \frac{(\theta_R + \phi)^2}{(\theta_L - \phi)^2} \quad (8)$$

Differently expressed, $$1 - Z = \frac{(\theta_L - \phi)^2 - (\theta_R + \phi)^2}{(\theta_L - \phi)^2} \quad (9)$$

If, as is convenient, $\theta_L$ and $\theta_R$ are equal, and $\phi$ is small as compared to $\theta$, then $$1 - Z = 4 \frac{\phi}{\theta} \quad (10)$$

Now when $\phi/\theta$ is equal to 1/100, the fractional light change is 4/100. Thus, if the angle $\theta$ is 1°, then a rotation angle $\phi$ of 0.01° would result in a 4% over-all change in intensity, which may readily be measured with high precision in spectrophotometers, or other apparatus including photometric means.

The two beams offset from extinction in opposite directions may be directed through the substance being analyzed consecutively or concurrently and offsetting of the beams may be obtained in various ways, all as will be discussed in detail hereinafter. Offsetting from extinction may be attained without rotation of any plane-polarizing element in the system, or alternatively, it is possible to consecutively pass through the substance being analyzed beams offset from extinction in opposite directions by first rotating either the polarizer or the analyzer from extinction in one direction and then in the opposite direction between fixed stops to attain accurate positioning.

Referring to the drawings, which are for illustrative purposes:

Figs. 1 to 7 are diagrammatic views respectively illustrating different embodiments of the apparatus of the invention.

As a matter of convenience, the polarizing elements of the polarimeters of the invention will be referred to hereinafter as Nicol prisms, although it will be understood that other polarizing elements may be substituted for the Nicol prisms.

Referring to Fig. 1 of the drawings, illustrated therein is a polarimeter 10 of the invention which includes a source 11 of monochromatic light, the light source preferably including collimating means, not shown, for rendering the light rays parallel. Light from the light source 11 passes through an aperture 12 and impinges on a first polarizing means which includes a single polarizing element or polarizer 13. Spaced from and aligned with the polarizer 13 is a second polarizing means which includes a single polarizing element or analyzer 14, the polarizing axes of the polarizer 13 and the analyzer 14 being at right angles to each other. Disposed between the polarizer and the analyzer is a sample zone containing a cell 15 for a substance to be examined, the cell itself being optically inactive, as by being provided with strain-free quartz faces, not shown.

Disposed between the polarizer 13 and the analyzer 14, either between the polarizer 13 and the cell 15, or the analyzer 14 and the cell 15, is a movable mounting 16 for levorotatory and dextrorotatory elements 17 and 18, the mounting 16 being illustrated as disposed between the polarizer and the cell in the particular construction disclosed in the drawing. The mounting may either be a reciprocable slide, a rotor, or the like, and is adapted to insert either the levorotatory element 17 or the dextrorotatory element 18 between the polarizer 13 and the analyzer 14. The elements 17 and 18 may be quartz discs, or the like. It is evident that the light source 11, polarizer 13 and elements 17 and 18 cooperate to provide a source of polarized light for transmission through the sample to be analyzed.

As will be apparent, if the levorotatory element 17 is disposed between the polarizer 13 and the analyzer 14, the plane of polarization of the plane polarized light transmitted by the polarizer 13 is rotated to the left, opposite rotation being obtained when the dextrorotatory element 18 is inserted between the polarizer and the analyzer. In this manner, the light source 11, the polarizer 13, the levorotatory element 17 and the dextrorotatory element 18 cooperate to provide a light source means for consecutively producing two beams of plane polarized light, the planes of polarization of which are angularly offset to the left and right, respectively, of the direction required for extinction by the analyzer 14 in the absence of an optically active substance from the cell 15. Under these conditions definite levels of light intensity are in each case transmitted by the analyzer 14. When an optically active sample is disposed in the cell 15, the offset angles of the two beams are changed, thereby changing the transmitted intensities of the two beams emergent from the analyzer 14, as hereinbefore discussed in detail.

The two beams pass through an aperture 19 and enter a photometric means 20 for measuring the intensities of the two beams. From the measured intensities, the relative intensity change produced by the sample substance in the cell 15 and the angle of rotation produced by the substance may be determined readily as hereinbefore discussed. The photometric means may include any suitable light sensitive element, such as a photoelectric cell, together with an appropriate measuring circuit and meter, not shown. Since the analyzer 14 and photometric means 20 cooperate to analyze the light coming from the sample cell 15 the area containing the analyzer and photometric means can be conveniently described as an analysis zone.

Assuming that the levorotatory and dextrorotatory elements 17 and 18 have equal light transmission and rotate the plane of polarization of incident polarized light through equal angles, the intensities of the two beams transmitted by the analyzer 14 will be equal in the absence of the cell 15. However, the rotation produced by an optically active substance in the cell when the cell is inserted between the polarizer and the analyzer will change the intensity differently for one beam than for the other, the difference between the resulting intensities, or the intensity ratio, being measured with the photometric means 20. As the example discussed earlier herein indicates, even very small angles of rotation produced by optically active substances can be made to result in large relative intensity changes so that such small rotation angles can be measured with great accuracy with the present invention.

Another feature of the present invention, as will be apparent from the polarimeter 10 of Fig. 1, is that it requires no divided circle and thus avoids the errors inherent in such a device.

A possible modification of the polarimeter 10 would be to employ a single optical light rotator, either levorotatory or dextrorotatory, instead of the two elements 17 and 18, such an optical light rotator being insertable and removable from the beam between the polarizer and the analyzer. With this arrangement, the polarizer and the analyzer would be offset from extinction to the left, for example. The optical light rotator would then have to be a dextrorotatory element with sufficient rotative capacity to rotate the plane of polarization of the light transmitted by the polarizer to the right of extinction when inserted into the beam. Thus, consecutive beams respectively offset to the left and right of extinction could be produced in this manner with a single optical light rotator.

Another possible modification would be to employ only the polarizer 18 and mount it for rotation to the left and right of extinction as earlier discussed.

Figure 2:
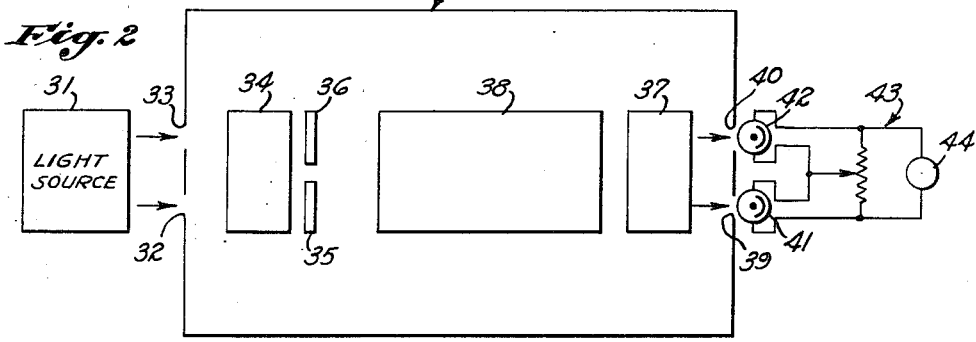

Referring to Fig. 2 of the drawings, illustrated therein is a polarimeter 30 which is generally similar to the polarimeter 10 and which includes a similar light source 31. Light from the source 31 is split into two beams, schematically represented by apertures 32 and 33, the two beams impinging on a polarizer 34. The two transmitted beams, now plane polarized and having parallel planes of polarization, impinge on levorotatory and dextrorotatory elements 35 and 36, respectively, which offset the planes of polarization of the two beams in opposite directions from extinction, i. e., which offset the planes of polarization in opposite directions from a line drawn at right angles to the polarizing axis of an analyzer 37, the polarizing axis of the latter being perpendicular to the polarizing axis of the polarizer 34. An optically inactive cell 38 is disposed between the polarizer 34 and the analyzer 37 and is adapted to contain an optically active substance to be examined. The two beams transmitted by the analyzer 37 pass through apertures 39 and 40, respectively, and impinge on photocells 41 and 42, respectively, the latter being connected in opposition in a bridge circuit 43 which includes a meter 44 for indicating the intensity difference between the two beams transmitted by the analyzer. The mode of operation of the polarimeter 30 is similar to that of the polarimeter 10 and will not be discussed in detail. It will be noted that an advantage of the polarimeter 30 over the polarimeter 10 is that the polarimeter 30 includes no moving parts so that possible errors from this source are avoided.

Figure 3:
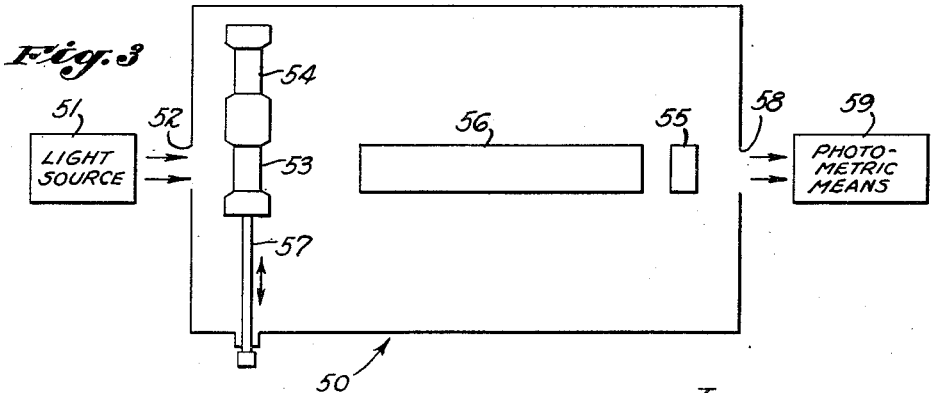

Referring to Fig. 3 of the drawings, illustrated therein is a polarimeter 50 of the invention which includes a light source 51, similar to the light source 11, light from the source 51 passing through an aperture 52. Two polarizers 53 and 54 and an analyzer 55 are provided, the analyzer being aligned with the aperture 52 and an optically inactive cell 56 for the substance to be analyzed being disposed between the analyzer 55 and the polarizers 53 and 54. The polarizers are carried by a movable mounting 57 which may be a reciprocable slide, a rotor, or the like, for alternately bringing the polarizers 53 and 54 into the light beam, the mounting being illustrated as a slide. The polarizers 53 and 54 are respectively positioned so that the planes of polarization of the plane polarized light transmitted thereby are offset to the left and right of extinction. Thus, by placing first one and then the other of polarizers 53 and 54 in the light beam, plane polarized beams whose planes of polarization are oppositely offset from extinction are consecutively produced. The portions of the two beams which are transmitted by the analyzer 55 pass through an aperture 58 and impinge on a light sensitive means 59 of any suitable character. The mode of operation of the polarimeter 50 will be apparent from what has gone before. A variation of the embodiment of Fig. 3 involves interchanging the polarizer pair 53 and 54 with the analyzer 55, the operation being in no way otherwise altered.

Referring to Fig. 4 of the drawings, illustrated therein is a polarimeter 60 of the invention which again includes a light source 61 similar to the light source 11, light from the source being split into two beams, as schematically indicated by apertures 62 and 63. The two light beams impinge on polarizers 64 and 65 which are illustrated as Nicol wedges respectively offset to the left and right of extinction with respect to an analyzer 66. An optically inactive cell 67 is disposed between the polarizers and the analyzer and is adapted to contain a substance to be examined. The two beams of plane polarized light produced by the polarizers 64 and 65 impinge on the analyzer 66 and the portions thereof transmitted by the analyzer pass through apertures 68 and 69, respectively, and impinge on photocells 70 and 71, respectively. These photocells are connected in opposition in a bridge circuit 72 having a meter 73 for indicating the intensity difference between the two beams transmitted by the analyzer, the difference being indicative of the rotation produced by the substance being examined as hereinbefore discussed. It is thought that the operation of the polarimeter 60 will be apparent from the foregoing.

Referring to Fig. 5 of the drawings, illustrated therein is a polarimeter 80 which includes a light source 81 producing two beams which pass through apertures 82 and 83 and impinge on polarizers 84 and 85, respectively, the latter having analyzers 86 and 87 aligned therewith, respectively, and being oppositely offset from extinction relative to the respective analyzers. A cell 88 is disposed between the polarizers and the analyzers. The beams transmitted by the analyzers 86 and 87 pass through apertures 89 and 90, respectively, and impinge on photocells 91 and 92, respectively, the latter being connected in a bridge circuit 93 having therein a meter 94 for indicating the intensity difference between the light beams transmitted by the analyzers. It is apparent that in this embodiment the analyzers 86 and 87 will ordinarily be arranged with their polarizing axes parallel. The mode of operation of the polarimeter 80 will be apparent from the previous descriptions of the modes of operation of other embodiments.

Referring to Fig. 6 of the drawings, illustrated therein is a polarimeter 100 of the invention which includes a light source 101 directing a beam of light through an aperture 102. This embodiment of the invention includes two polarizers 103 and 104 and two analyzers 105 and 106, the polarizers 103 and 104 being offset oppositely from extinction with respect to the analyzers 105 and 106, respectively. The polarizers and analyzers are carried by movable mounting 107, illustrated as a reciprocable slide, by means of which the polarizer 103 and analyzer 105, or the polarizer 104 and the analyzer 106, may be brought into the light beam. A stationary cell 108 for a substance to be analyzed is disposed in the light beam between the polarizers and the analyzers, the cell remaining fixed while the mounting 107 is repositioned. Light transmitted by either of the analyzers passes through an aperture 109 to a photometric means 110 for measuring the relative intensities or intensity ratio of the two consecutively produced means. The mode of operation of the polarimeter 100 will be apparent from what has gone before.

Referring to Fig. 7 of the drawings, illustrated therein is a polarimeter 120 of the invention which includes a light source 121 directing a beam of light through an aperture 122 onto a polarizer 123, the latter being set for extinction with respect to an analyzer 124. Disposed between the polarizer and the analyzer is a cell 125 for the substance to be examined. Also disposed between the polarizer and the analyzer, and between the polarizer and the cell in the particular construction illustrated, is a magnetic light rotator indicated generally by the numeral 126. The rotator 126 includes a coil 127 around an element 128 which, when subjected to a magnetic field, rotates the plane of polarization of plane polarized light in one direction or the other depending upon the direction of the magnetic field, i. e., depending upon the direction of current flow through the coil, and upon the nature of the substance contained in the element 128. As is well known, this phenomenon is known as the Faraday effect. Thus, by flowing current through the coil 127 first in one direction and then in the other, two beams of plane polarized light are consecutively produced with planes of polarization oppositely offset from extinction with respect to the analyzer 124, a feature of this embodiment being that the amount of offset may readily be varied by varying the current flow through the coil. As in various of the preceding embodiments, light transmitted by the analyzer 124 passes through an aperture 129 to a photometric means 130 for measuring the relative intensities of the two beams passed consecutively through the cell 125. It is thought that, with the foregoing description, the mode of operation of the polarimeter 120 will be apparent.

From the foregoing, it will be noted that in each of the embodiments disclosed, means is provided for producing, either concurrently or consecutively, two beams of plane polarized light the planes of polarization of which are angularly offset to the left and right, respectively, of extinction so that the effect of rotation of the planes of polarization of the beams by a substance introduced therein is to decrease the transmitted intensity of one beam through the analyzer and to increase the transmitted intensity of the other through the analyzer. Thus, since relative intensities can be measured very accurately with existing photometric means, such as photocells associated with suitable measuring means, or the like, very accurate results and great sensitivity are attained, which are important features.

While I have disclosed various exemplary embodiments of the invention, it will be understood that the invention may be embodied in other forms without necessarily departing from the spirit thereof.

I claim as my invention:

1. The method of measuring the rotation of the plane of polarization of plane polarized light produced by a substance through which the plane polarized light passes which comprises, passing a first beam of plane polarized light having a pre-determined plane of polarization through said substance and through a polarizing medium having a polarizing axis, the relative orientation of the plane of said first beam and said polarizing axis being such that said axis is angularly offset in one direction by a small predetermined angle from perpendicularity with respect to said predetermined plane of polarization of said first beam, passing a second beam of plane polarized light having a predetermined plane of polarization through said substance and through a polarizing medium having a polarizing axis, the relative orientation of the plane of said second beam and the polarizing axis of the polarizing medium through which said second beam passes being such that said last-named axis is angularly offset in the opposite direction by a predetermined small angle from perpendicularity with respect to the predetermined plane of polarization of said second beam, and measuring the ratio of the intensities of the transmitted portions of said two beams to determine the extent to which said substance rotates the plane of polarization of plane polarized light.

2. A method according to claim 1 and wherein the polarizing axis of the polarizing medium through which said first beam passes and the polarizing axis of the polarizing medium through which said second beam passes are parallel.

3. A method according to claim 1 and wherein said two beams are passed through said substance simultaneously.

4. A method according to claim 1 and wherein said two beams are passed through said substance sequentially.

5. The method of measuring the rotation of the plane of polarization of plane polarized light produced by a substance through which the plane polarized light passes which comprises, passing a first beam of plane polarized light having a pre-determined plane of polarization through said substance and through a polarizing medium having a polarizing axis, the relative orientation of the plane of said second beam and the polarizing axis of the polarizing medium through which said second beam passes being such that said last-named axis is angularly offset in one direction by a small predetermined angle of not more than a few degrees from perpendicularity with respect to said predetermined plane of polarization of said first beam, passing a second beam of plane polarized light having a predetermined plane of polarization through said substance and through a polarizing medium having a polarizing axis, the relative orientation of the plane of said second beam and the polarizing axis of the polarizing medium through which said second beam passes being such that said last-named axis is angularly offset in the opposite direction by said predetermined small angle from perpendicularity with respect to the predetermined plane of polarization of said second beam, and measuring the ratio of the intensities of the transmitted portions of said two beams to determine the extent to which said substance rotates the plane of polarization of plane polarized light.

6. In a polarimeter of the type that measures the rotation of the plane of polarization of a beam of polarized light produced by a substance through which the beam passes and includes a source of light for supplying light energy to be passed through a substance to be analyzed and photometric means for sensing the intensity of light energy transmitted through said substance, optical analyzing apparatus adapted to be positioned between said light source and said photometric means, said analyzing apparatus including light polarizer means, a polarization analyzer having a polarizing axis and a sample chamber located between said polarizer means and said analyzer, said polarizer means and analyzer being relatively movable between fixed stops defining a first and second predetermined fixed operating position, the relative orientations of said polarizer means and analyzer being such that in said first position the polarizing axis of said analyzer is angularly displaced in one direction by a small predetermined angle from perpendicularity with respect to the effective polarizing axis of said polarizer means, and in said second position the polarizing axis of said analyzer is angularly displaced in the opposite direction by said small predetermined angle from perpendicularity with respect to the effective polarizing axis of said polarizer means, and means for relatively moving said polarizer means and analyzer from one to the other of said fixed operating positions.

7. A polarimeter of the type defined in claim 6 and wherein said polarizing means includes a polarizer and a beam-rotating device comprising levorotatory and dextrorotary elements, said beam-rotating device being selectively movable between said fixed stops to a first predetermined operating position wherein said levorotatory element is in registry with said polarizer and to a second predetermined operating position wherein said dextrorotatory element is in registry with said polarizer.

References Cited in the file of this patent

UNITED STATES PATENTS

| | | |
|---|---|---|
| 1,977,359 | Styer | Oct. 16, 1934 |
| 2,078,181 | Land | Apr. 20, 1937 |
| 2,244,362 | Hartig | June 3, 1941 |
| 2,351,539 | Peck | June 13, 1944 |
| 2,450,761 | Mac Neille | Oct. 5, 1948 |
| 2,503,808 | Earl et al. | Apr. 11, 1950 |
| 2,509,068 | McMahon | May 23, 1950 |

FOREIGN PATENTS

| | | |
|---|---|---|
| 656,389 | Germany | Feb. 8, 1938 |
| 540,876 | Great Britain | Nov. 4, 1941 |
| 23,617 | France | Dec. 14, 1922 |

(Addition to No. 501,330)